United States Patent [19]
Carroll

[11] Patent Number: 6,142,442
[45] Date of Patent: Nov. 7, 2000

[54] LOW WATTAGE, HIGH FLOW ELECTRICAL CONTROL VALVE

[75] Inventor: John B. Carroll, Irwin, Pa.

[73] Assignee: Westinghouse Air Brake Company, Wilmerding, Pa.

[21] Appl. No.: 09/036,823

[22] Filed: Mar. 9, 1998

[51] Int. Cl.[7] .................................................. F16K 31/40
[52] U.S. Cl. ........................................ 251/30.02; 251/331
[58] Field of Search .................................. 251/30.02, 28, 251/331, 61.1

[56] References Cited

U.S. PATENT DOCUMENTS

| | | | |
|---|---|---|---|
| 4,070,004 | 1/1978 | Friswell | 251/331 |
| 5,069,420 | 12/1991 | Stobbs et al. | 251/30.02 |
| 5,163,706 | 11/1992 | Maguran, Jr. et al. | 251/30.02 X |
| 5,178,359 | 1/1993 | Stobbs et al. | 251/30.02 |
| 5,836,571 | 11/1998 | Streitman et al. | 251/331 |

*Primary Examiner*—Denise L. Ferensic
*Assistant Examiner*—Meredith H. Schoenfeld
*Attorney, Agent, or Firm*—James Ray & Associates

[57] ABSTRACT

The invention provides an electrically activated valve assembly for control of a fluid. It has a diaphragm with a control chamber on one side and a flow barrier on the second side. Portions of a first flow passage and a second flow passage are on the second side of the diaphragm, with the flow barrier between them. When the control chamber has a relatively high pressure, the diaphragm is pressed against the flow barrier, isolating the first flow passage from the second flow passage. When the control chamber has a relatively low pressure, the diaphragm moves away from the flow barrier, so flow may occur between the first flow passage and the second flow passage. The position of the diaphragm is determined by pressure in the control chamber so the pressure in the control chamber controls the fluid flow connection between the first flow passage and the second flow passage. The valve also has an electrically activated valve responsive to an electrical signal to control pressure in a flow passageway to the control chamber so that when the electrically activated valve is energized, the control pressure is changed, so the electrically activated valve controls the fluid flow connection between the first flow passage and the second flow passage.

19 Claims, 9 Drawing Sheets

LOW WATTAGE, HIGH FLOW ELECTRICAL CONTROL VALVE

FIELD OF THE INVENTION

The present invention relates, in general, to brake systems which utilize both fluid and electrical signals and, more particularly, this invention relates to a low wattage, high flow electrical control valve for use in an electro-pneumatic railway brake control system.

BACKGROUND OF THE INVENTION

In the conventional railroad air brake system, as developed from the Westinghouse air brake, there is a brake pipe air line which passes from the lead locomotive and from vehicle to vehicle down the length of the train consist and provides two basic functions.

First, air from the brake pipe is used to charge compressed air reservoirs disposed on each of the railroad cars. The air stored in these reservoirs provides the energy needed to apply the brake shoes when a brake application is required. When the train is running normally, and no brake application is needed, a high pressure, typically about 90 psi for freight trains and about 110 psi for passenger trains, exists in the brake air line. The reservoirs on the cars are charged to the same pressure as the air in the brake pipe. Second, when a brake application is required, air is vented from the brake pipe air line through a valve located in the lead locomotive. This causes the pressure in the brake pipe air line to be reduced by a controlled amount. In the individual cars of the train, this reduction of pressure is used as a signal to apply the brakes. In this event, valving in the cars utilizes the compressed air in the reservoirs to supply air to brake cylinders which, in turn, apply a force to the brake shoes so that the brakes are applied.

Although this conventional air brake system was an enormous improvement over the art prior to it, it nevertheless had some features where improvement was possible. For one thing, the time required for a pressure decrement to propagate down the line of cars in a long freight train is relatively long. For example, the time to complete a full service application would be about a minute for a mile-long train. Hence, when a brake application is required, it takes some time before all of the brakes in the train are applied. This is the case for both normal and emergency brake applications, although emergency applications are completed in less than half the time required for service applications.

There are also some operational difficulties due to the fact that the same compressed air line is used both for charging the air reservoirs in the cars and for signalling a brake application. When a brake application is made, some of the air in the air reservoirs in the cars is depleted. Since the pressure in the brake pipe air line has been reduced to signal the brake application, there is not sufficient air pressure in the brake pipe air line to recharge the air in the reservoirs. The air in the reservoirs cannot be recharged to its initial pressure while the brake line air pressure is low for applying brakes. Another restriction of conventional pneumatic brakes designed for use on very long trains is that they must be of the direct release type. This means that, while the brakes may be applied in stages, when a brake release is made the brakes must be released completely.

One necessary practice which stems from this aspect of traditional airbrake systems is the practice of power braking. This is a case in which an engineer, upon starting to descend a grade, makes a brake application which is too heavy for a section of the grade, so that the train does not maintain its preferred speed. In this case, the engineer may apply engine power to maintain speed. Hence, the brakes and locomotive are working against each other. Fuel is expended and brake shoes are worn.

One method of decreasing the time needed for the brake application signal to reach remote portions of the train is to provide a radio link so that when a signal originates in a lead locomotive to apply brakes, a radio signal is transmitted which is received at some distance down the line of cars. Where the signal is received, it causes local venting of the brake line so that brakes are applied more rapidly. The WABCO EPIC a brake system, for example, may be operated with a radio link for this purpose.

The radio approach may have difficulty due to terrain which intervenes between the locomotive and the remote receiver causing the remote unit to fail to dump brake pipe pressure. Hence, some systems use electrical trainlines which are electric cables connected between cars down the length of the train. These electric cables carry signals to electro-pneumatic valves which vent brake pipe air at many points along the train and, hence, cause a relatively rapid and more uniform brake application.

Either of these approaches, the radio link or the trainline link, can improve the response time of the system. However, the operational difficulty of not being able to partially or gradually reduce a brake application which is in force is not solved by shortening the time needed for brake pipe pressure to drop.

SUMMARY OF THE INVENTION

In a first aspect, the present invention provides an electrically activated valve assembly for control of a fluid. The valve assembly includes a diaphragm with a control chamber on a first side and a diaphragm sealing surface on the second side. Such valve has a flow barrier on the second side which has a sealing surface for sealing against the sealing surface of the diaphragm. Portions of a first flow passage and a second flow passage are on the second side of the diaphragm, with the flow barrier disposed between them. The diaphragm has at least a first position in which a fluid flow passageway exists in a gap between the sealing surface of the diaphragm and the sealing surface of the flow barrier so that fluid communication is provided between the first flow passage and the second flow passage. The diaphragm also has a second position in which the sealing surface of the diaphragm seats against the sealing surface of the flow barrier thereby closing such fluid communication between the first flow passage and the second flow passage. The position of the diaphragm is determined by a control pressure in the control chamber in relation to a first pressure in the first flow passage and a second pressure in the second flow passage whereby, within a range of pressures for the first pressure and the second pressure, the pressure in the control chamber controls the fluid communication between the first flow passage and the second flow passage. The valve assembly also has a third passageway having a third pressure, the third passageway being connected to the control chamber of the diaphragm valve so that the control pressure is about equal to the third pressure in the third passageway.

The valve assembly also has an electrically activated valve located within the fluid containment structure. The electrically activated valve is responsive to an electrical signal to open a second gap to provide fluid communication between the third passageway and a fourth passageway having a fourth pressure so that when the electrically activated valve is energized, the control pressure becomes about equal to the fourth pressure of the fourth passageway. There is also an alternate pressure control path connected to the third passageway and to a fifth passageway having a fifth pressure so that when the electrically activated valve is deenergized, the third pressure and the control pressure are about equal to the fifth pressure. In this manner, the electrically activated valve controls the control pressure and therefore controls fluid communication between the first passageway and the second passageway.

In another embodiment, the invention is an electrically activated brake valve assembly for a pneumatic brake system on a railway vehicle. The assembly has an electro-pneumatic service brake valve having a service electrical valve connected so as to control pressure in a service control chamber of a service diaphragm valve, the service diaphragm valve having a first service flow passage connected to an auxiliary reservoir of the railway vehicle and a second service flow passage connected to a brake cylinder pressure line so that an electrical signal to the service electrical valve controls air flow to the brake cylinder pressure line to make a service brake application.

The assembly also has an electro-pneumatic emergency brake valve having an emergency electrical valve connected so as to control pressure in an emergency control chamber of an emergency diaphragm valve, the emergency diaphragm valve having a first emergency flow passage connected to an emergency reservoir of the railway vehicle and a second emergency flow passage connected to the brake cylinder pressure line so that an electrical signal to the emergency electrical valve controls air flow to the brake cylinder pressure line to make an emergency brake application.

The assembly also has an electro-pneumatic release valve having a release electrical valve connected so as to control pressure in a release control chamber of a release diaphragm valve, the release diaphragm valve having a first release flow passage connected to an exhaust and a second release flow passage connected to the brake cylinder pressure line so that an electrical signal to the release electrical valve controls air flow from the brake cylinder pressure line to the exhaust.

OBJECTS OF THE INVENTION

It is, therefore, one of the primary objects of the present invention to provide a fluid flow control valve assembly which may be both opened or closed by a relatively low wattage electrical signal.

Another object of the present invention is to provide a low wattage electrically controlled valve assembly for admitting a high flow of fluid from a source of pressurized fluid to an enclosed volume in which the pressure is to be controlled.

An additional object of the present invention is to provide a pressure application valve assembly which is closed in the absence of an electrical signal being applied to it and which opens when an electrical signal is applied to it.

A further object of the present invention is to provide a pressure release valve assembly which is open in the absence of an electrical signal being applied to it and which closes when an electrical signal is applied to it.

Still another object of the present invention is to provide a low wattage electrically controlled valve assembly for dumping fluid at a high rate from an enclosed volume in which pressure is to be controlled.

Yet another object of the present invention is to provide a low wattage electrically controlled brake valve assembly for admitting brake fluid to a brake cylinder of a vehicle.

A further object of the present invention is to provide a low wattage electrically controlled brake valve assembly for dumping brake fluid from a brake cylinder of a vehicle.

It is an additional object of the present invention to provide a low wattage electrically controlled valve assembly for both supplying brake fluid to a brake cylinder of a vehicle and also for dumping brake fluid from the brake cylinder.

It is also an object of the present invention to provide an electrically activated brake valve assembly having a service valve, an emergency valve and a release valve; an electrical interlock being provided so that when either a service brake application is in effect, or an emergency brake application is in effect, the release valve is closed.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
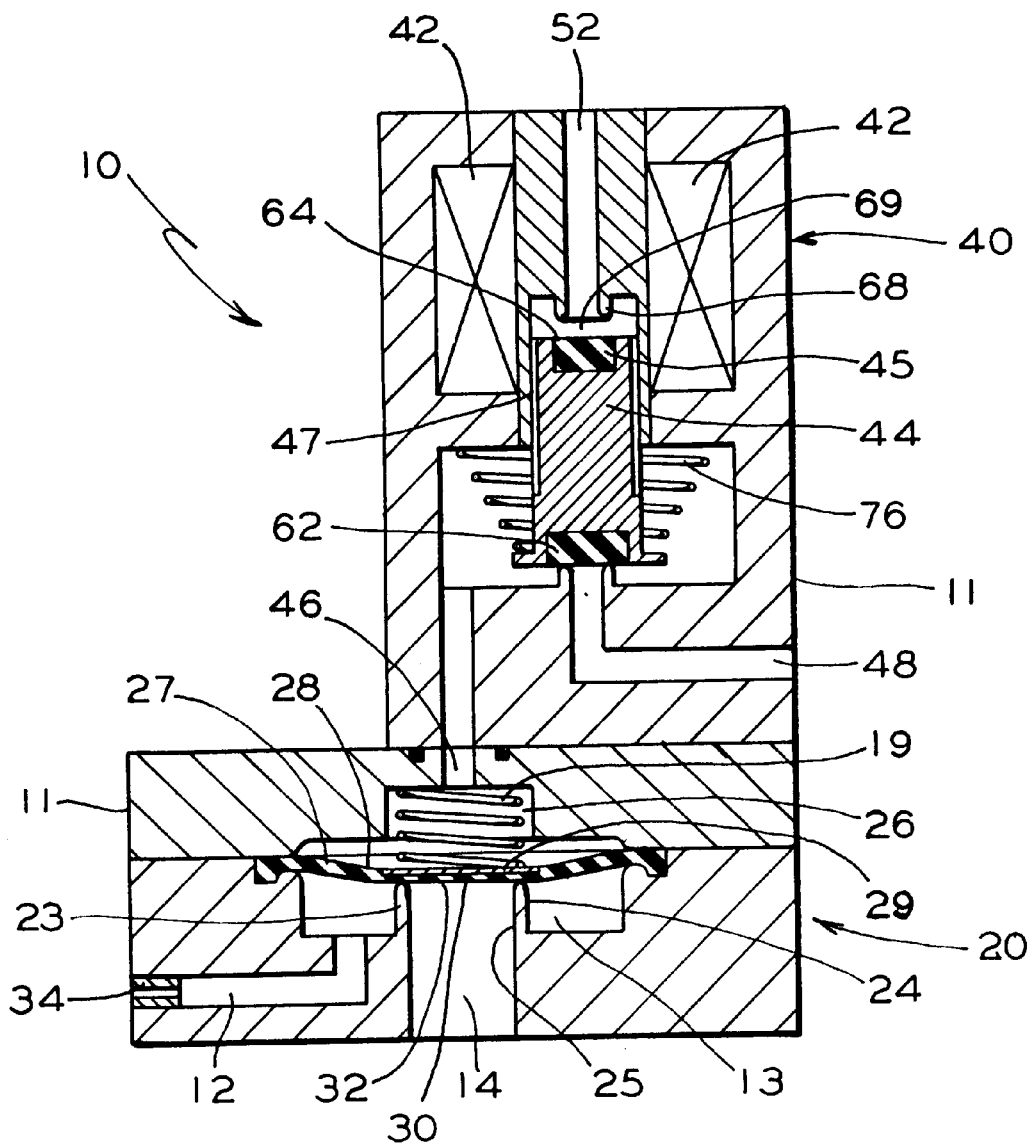
FIG. 1 is a cross-sectional view which shows one presently preferred embodiment of a pressure application valve assembly according to the present invention in a deenergized, closed configuration.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures, for the sake of clarity and understanding of the invention.

Reference is now made to FIGS. 1 through 9 of the drawings. These figures show an electrically activated valve assembly, generally indicated as 10 in FIGS. 1 and 2, 60 in FIGS. 3 and 4, 120 in FIGS. 6 and 9, 100 in FIGS. 7 and 9 and 140 in FIGS. 8 and 9. The electromagnetic valve assembly 10, 60, 120,100 or 140 is for control of a fluid. It is disposed within a fluid containment structure such as 11 in FIGS. 1 and 2, 61 in FIGS. 3 and 4 or 163 in FIGS. 6,7,8 and 9.

Figure 2:
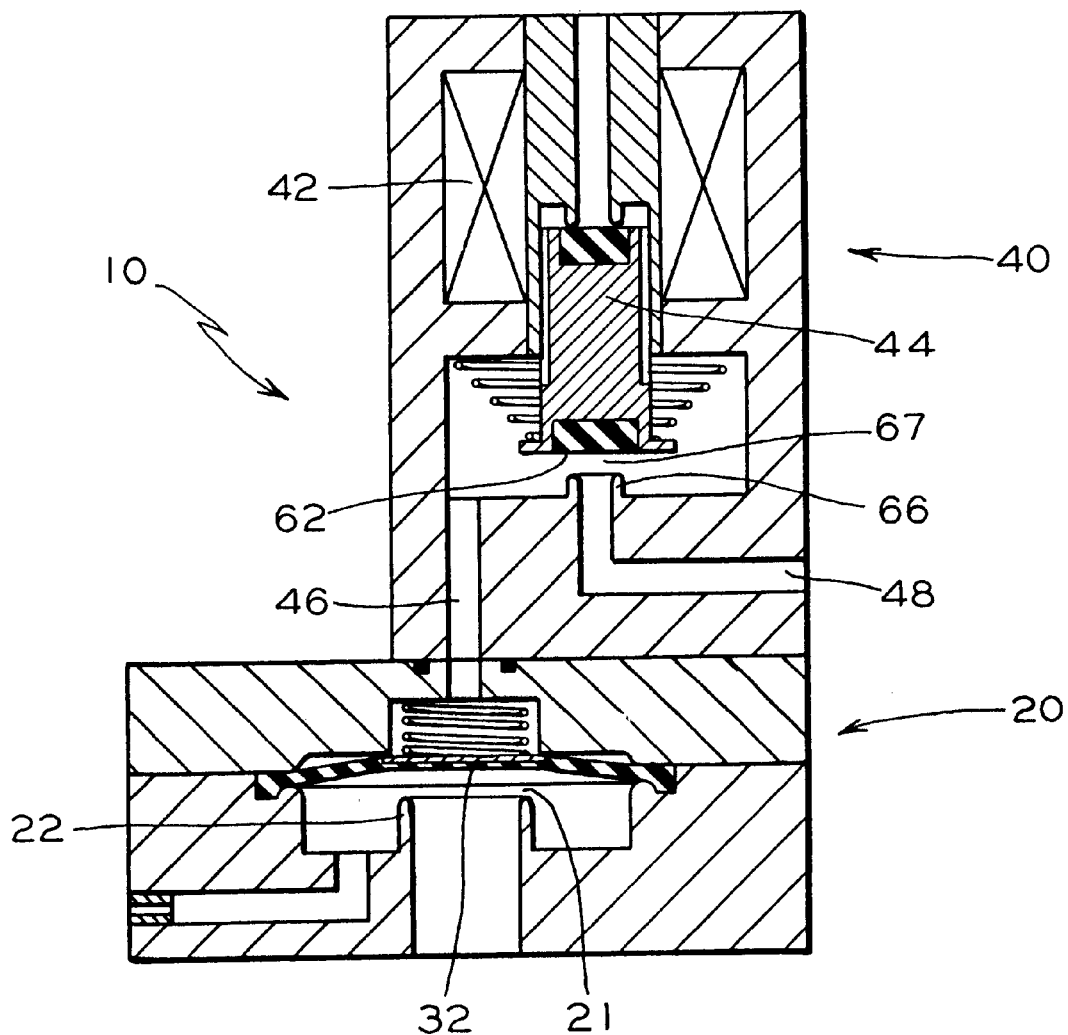
FIG. 2 is a cross-sectional view which shows the pressure application valve assembly, illustrated in FIG. 1, in an energized, open position for applying pressure.
Figure 3:
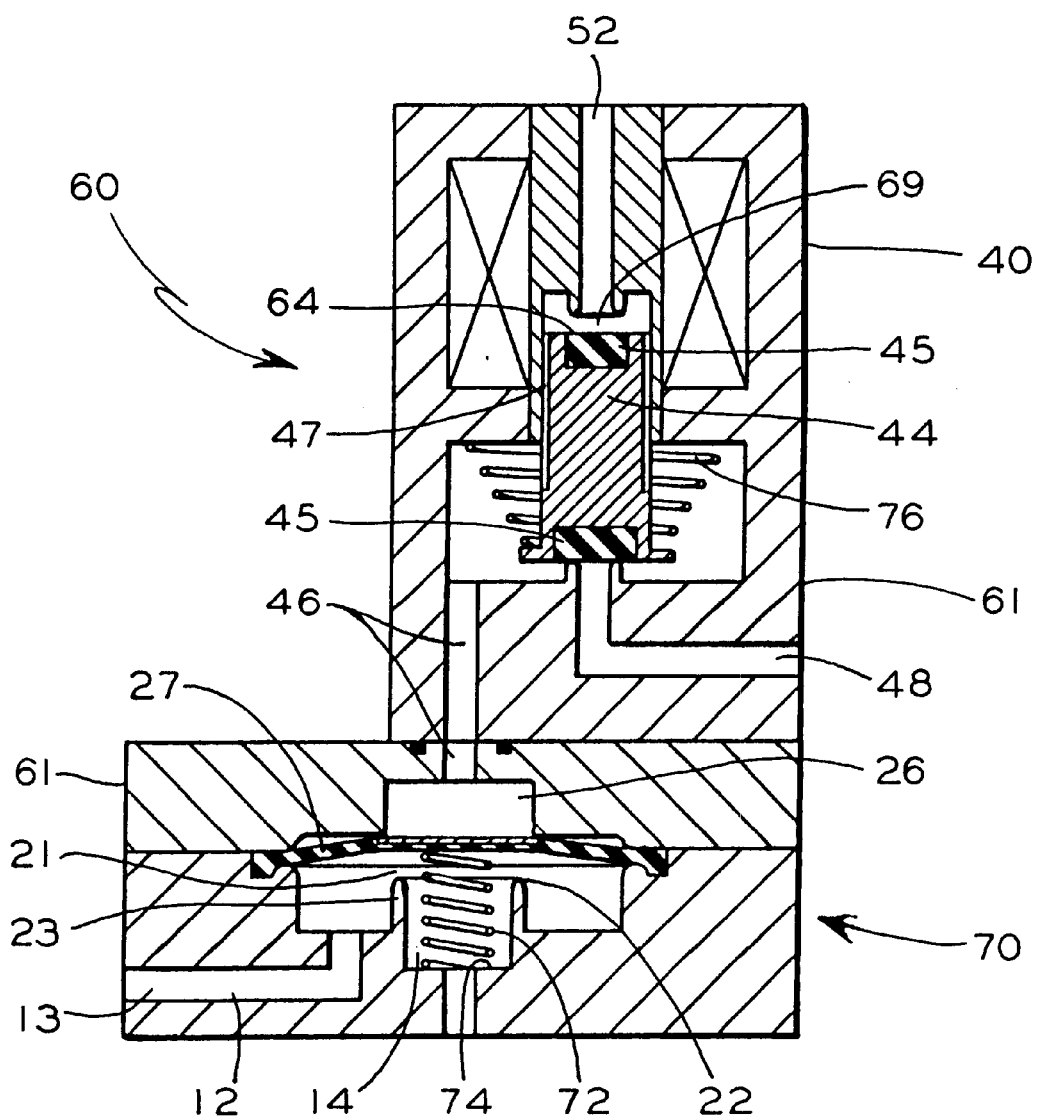
FIG. 3 is a cross-sectional view which shows one presently preferred embodiment of a pressure release valve assembly according to the present invention in a deenergized, open position for releasing pressure.
Figure 4:
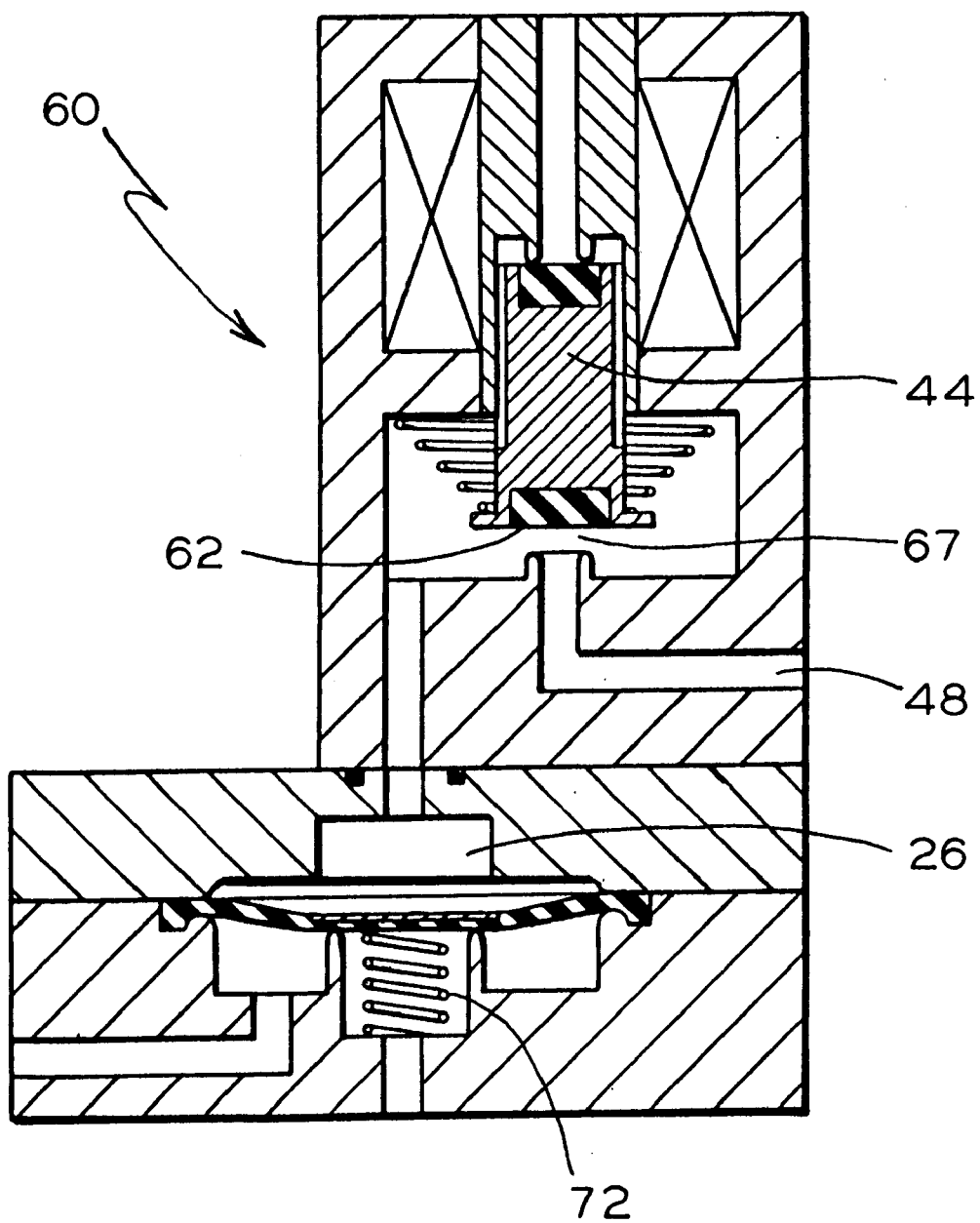
FIG. 4 is a cross-sectional view which shows the pressure release valve assembly, illustrated in FIG. 3, in an energized, closed position.
Figure 6:
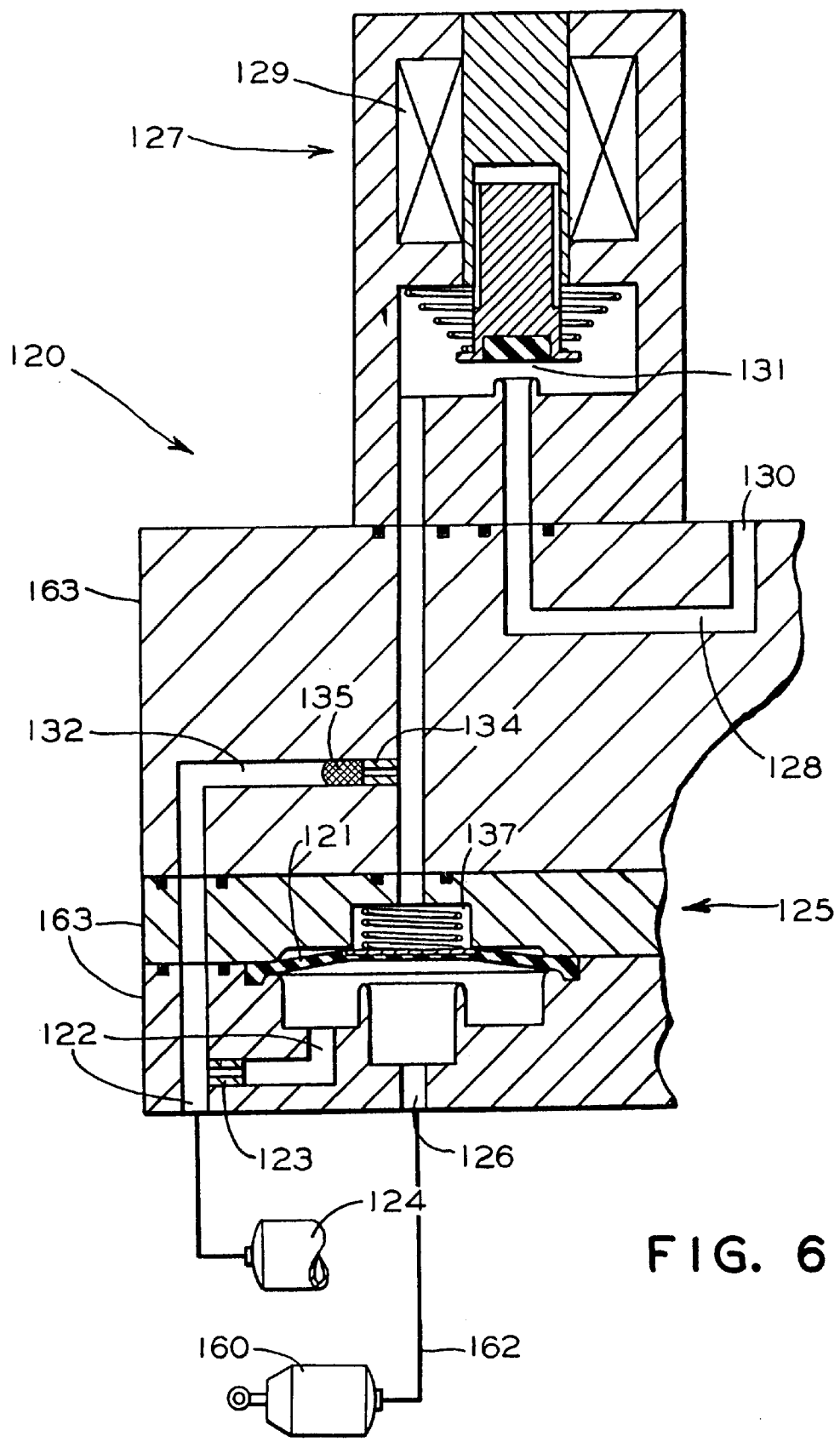
FIG. 6 illustrates an emergency brake application valve in an energized, open position for making an emergency brake application.
Figure 7:
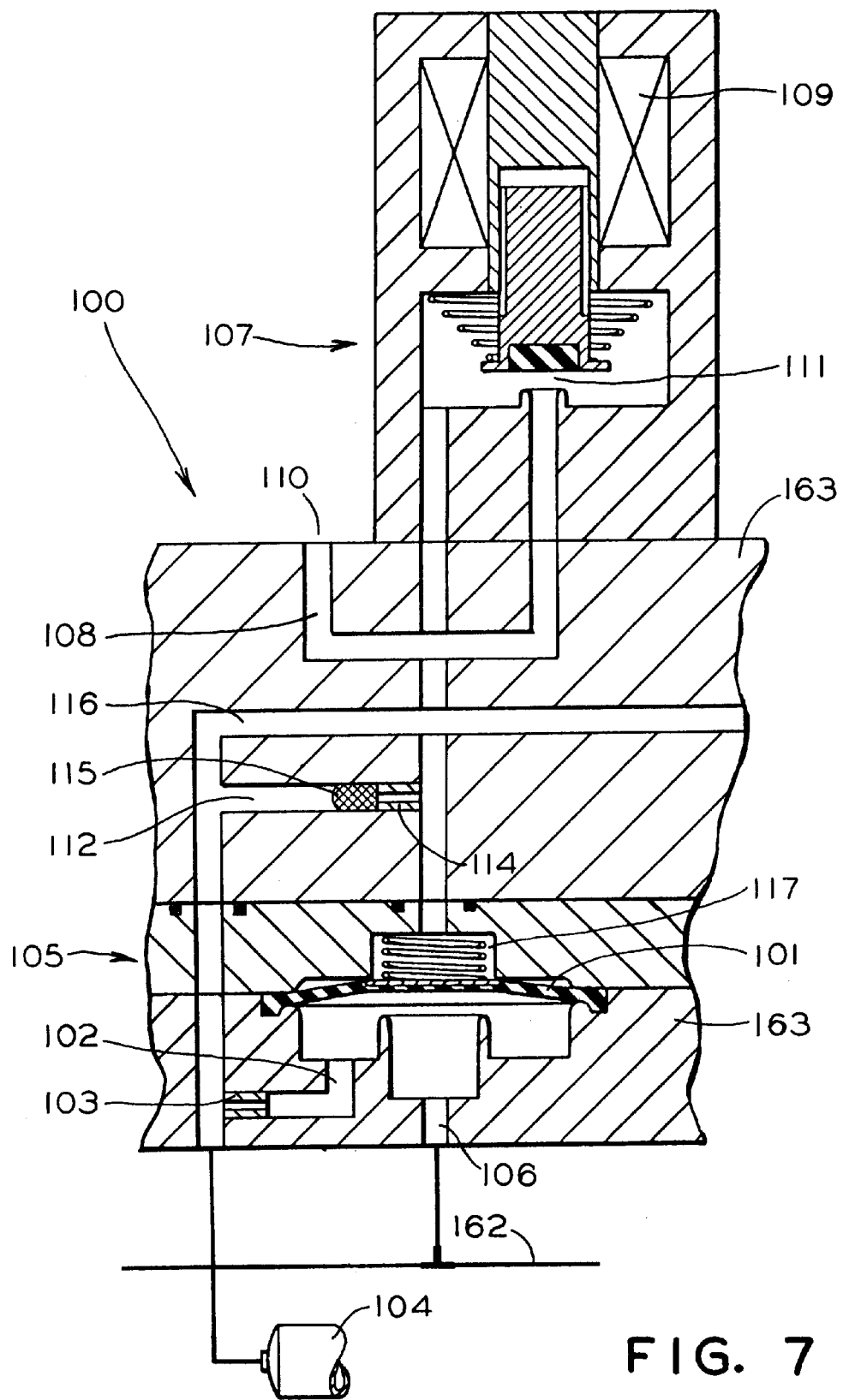
FIG. 7 illustrates a service brake application valve in an energized, open position for making a service brake application.
Figure 8:
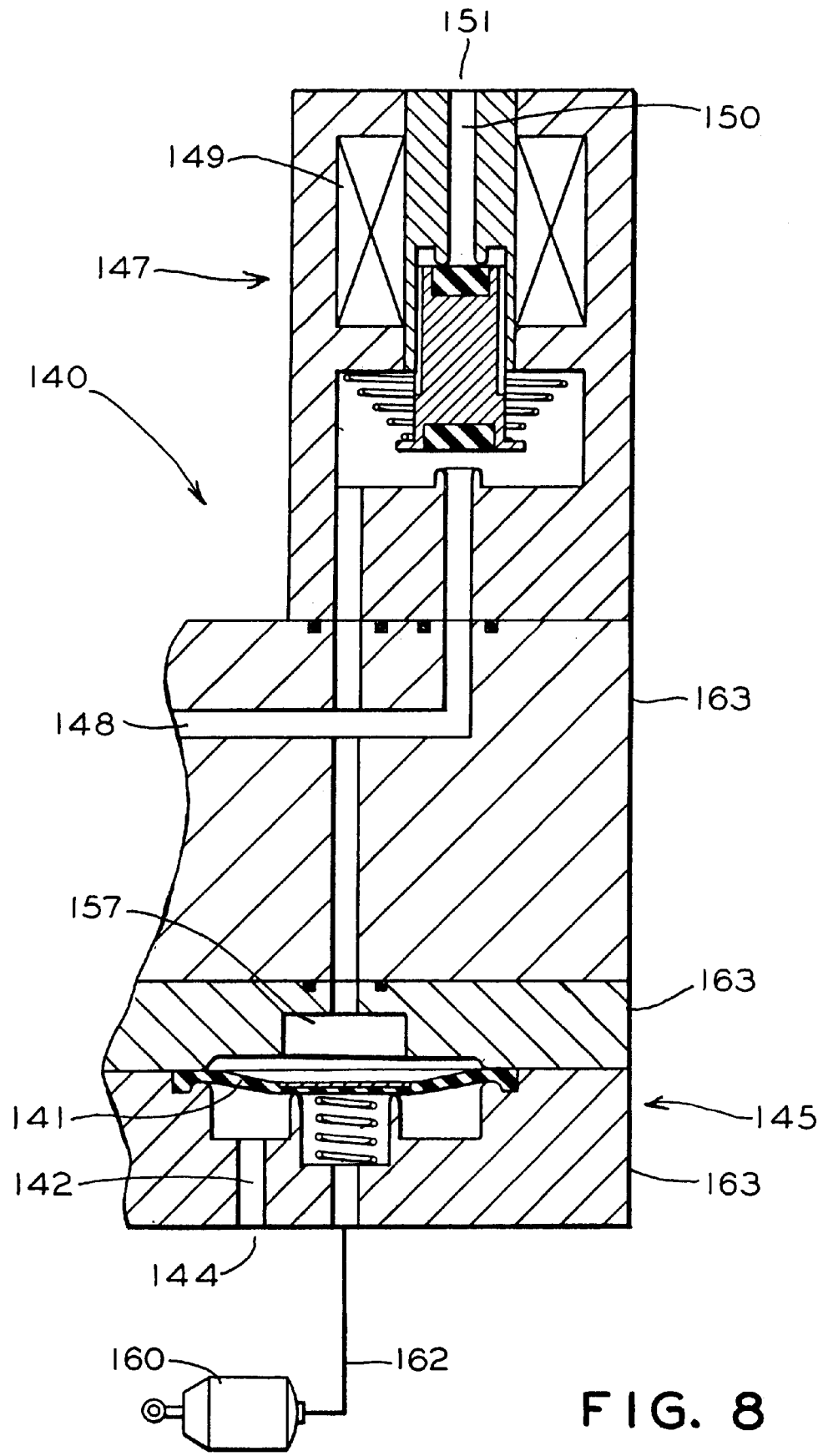
FIG. 8 illustrates a brake release valve in an energized, closed position.

The electrically activated valve assembly has a diaphragm valve such as 20 in FIGS. 1 and 2, 70 in FIGS. 3 and 4 or as 125, 105 or 145 in FIGS. 6,7,8, respectively, and 9.

It has a diaphragm such as 27 shown in FIGS. 1,2,3 and 4 or diaphragm 121, 101 or 141 as shown in FIGS. 6,7, 8, respectively, and 9. The diaphragm is adjacent a control chamber such as 26 in FIGS. 1,2,3 and 4, or as 137, 117 or 157 in FIGS. 6,7,8, respectively, and 9. Details of the diaphragm valve are best seen in FIGS. 1,2,3 and 4. FIG. 1 shows diaphragm valve 20 in a closed position and FIG. 2 shows diaphragm valve 20 in an open position. FIG. 3 shows diaphragm valve 70 in a closed position and FIG. 4 shows diaphragm valve 70 in an open position.

These figures show control chamber 26 on a first side 28 of diaphragm 27. Diaphragm 27 also has a diaphragm sealing surface 32 on a second side 30 of diaphragm 27. A flow barrier 23 is on a second side 30 of diaphragm 27. Flow barrier 23 has a sealing surface 22 (seen in FIGS. 2 and 3) for sealing against the diaphragm sealing surface 32.

Diaphragm valves 20 and 70 have a first passageway 12 having a portion thereof 13 on the second side 30 of diaphragm 27 and on a first side 24 of the flow barrier 23.

Diaphragm valves 20 and 70 also have a second passageway 14 having a portion located on the second side 30 of the diaphragm 27 and on the second side 25 of flow barrier 23. Diaphragm 27 has at least a first position, shown in FIGS. 2 and 3, wherein a gap 21 exists between the sealing surface 32 of diaphragm 27 and the sealing surface 22 of flow barrier 23 so that fluid communication is provided between the first passageway 12 and the second passageway 14. Diaphragm 27 also has a second position, shown in FIGS. 1 and 4, wherein the sealing surface 32 of diaphragm 27 seats against the sealing surface 22 of flow barrier 23 thereby preventing fluid communication between the first passageway 12 and the second passageway 14. The location of diaphragm 27 is determined by a control pressure in the control chamber 26 in relation to a first pressure in the first passageway 12 and a second pressure in the second passageway 14. In this manner, the pressure in control chamber 26 controls the fluid communication between first passageway 12 and second passageway 14.

Valve assemblies 10 and 60 also have a third passageway 46 having a third pressure, the third passageway 46 being connected to control chamber 26 of the diaphragm valve 20 or 70 so that the control pressure is about equal to the third pressure in the third passageway 46.

Valve assemblies 10 and 60 also have an electrically activated valve 40 located within the fluid containment structure 11 or 61. The electrically activated valve 40 is responsive to an electrical signal supplied on coil 42 to move magnetic shuttle 44 to open a second gap 67, which is seen in FIGS. 2 and 4, to provide fluid communication between the third passageway 46 and a fourth passageway 48 having a fourth pressure so that when the electrically activated valve 40 is energized, the control pressure becomes about equal to the fourth pressure of the fourth passageway 48.

When electrically activated valve 40 is deenergized, spring 76 presses magnetic shuttle 44 to close gap 67. In the deenergized condition, compliant insert 62 is pressed against sealing surface 66 of electrically activated valve 40 to close gap 67.

Valve assemblies 10 and 60 also have an alternate pressure control path 47 connected to the third passageway and to a fifth passageway 52 having a fifth pressure so that when the electrically activated valve 40 is deenergized, the third pressure and the control pressure are about equal to the fifth pressure and whereby the electrically activated valve 40 controls the control pressure and therefore controls fluid communication between the first passageway 12 and the second passageway 14. When electrically activated valve 40 is energized, compliant insert 64 is pressed against valve seat 68 to close a third gap 69.

The diaphragm valve 20, 125 or 105, in alternate embodiments, includes a choke, such as 34 shown in FIG. 1, 123 shown in FIG. 6 or 103 shown in FIG. 7, which is disposed in the first passageway 12, 122 or 102 to control a rate of fluid communication through the diaphragm valve.

Preferably, the diaphragm, shown in FIGS. 1,2,3 and 4 as 27. has a diaphragm stiffening member 29 on first side 28 thereof. Such diaphragm stiffening member 29, preferably, is brass which is bonded to diaphragm 27.

Figure 5:
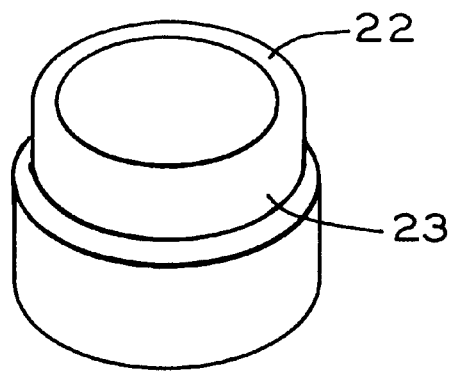
FIG. 5 illustrates a flow barrier and its sealing surface used in the valve assemblies illustrated in FIGS. 1–4.

FIG. 5 shows the sealing surface 22 of flow barrier 23. Sealing surface 22 is essentially a valve seat for diaphragm 27 to seat against. Sealing surface 22 is, preferably, formed as a closed figure, a portion of the flow barrier 23 enclosing a portion of the second passageway 14 and a portion 13 of the first passageway 12 enclosing a portion of the flow barrier. Preferably, sealing surface 22 of flow barrier 23 is formed as a circular annulus.

FIGS. 1 and 2 show spring 19 pressing against diaphragm 27 to bias it toward the sealing surface 22 of flow barrier 23 to bias the diaphragm valve 20 to the closed position, shown in FIG. 1, in which it does not permit flow between the first passageway 12 and the second passageway 14. It is preferred that spring 19 be disposed in control chamber 26, as shown in FIGS. 1 and 2.

FIGS. 3 and 4 show diaphragm valve 70 having spring 72 pressing against the diaphragm to bias it away from the sealing surface 22 of flow barrier 23 to bias the diaphragm valve 70 to the open position, shown in FIG. 3, in which it permits flow between the first passageway 12 and the second passageway 14.

FIGS. 3 and 4 show spring 72 located in second passageway 14, with an inside shoulder 74 in the second passageway 14 to provide a seat for spring 72.

FIGS. 1,2,3 and 4 show embodiments in which an alternate pressure control path 47 includes a third gap 69 which is open when electrically activated valve 40 is deenergized. Alternate pressure control path 47 provides fluid communication between the third passageway 46 and the fifth passageway 52 so that when the electrically activated valve 40 is deenergized, the third pressure and the control pressure are about equal to the fifth pressure of the fifth passageway 52. Third gap 69 is closed when the electrically activated valve 40 is energized.

FIG. 6 shows an embodiment which is an electrically activated valve assembly 120 connected as an emergency brake application valve for a railway vehicle. Valve assembly 120 is also included in FIG. 9. First emergency passageway 122 is connected to an emergency compressed air reservoir 124 of the railway vehicle and the second emergency passageway 126 is connected to a brake cylinder 160 of the railway vehicle by brake cylinder line 162. Fourth emergency brake passageway 128 is connected to an exhaust 130. Alternate pressure control path 132 is connected to fifth emergency brake passageway 133 is connected to the emergency reservoir 124 of the vehicle, so that when the electrically activated valve is deenergized, the control pressure is elevated to about a pressure of the emergency reservoir 124 and a net force on the diaphragm 121 closes the diaphragm valve 125 and so that when the electrically activated valve 127 is energized, the control pressure is vented to the fourth passageway 128 and therefore to the exhaust 130 so that a net force on the diaphragm unseats the diaphragm thereby opening the diaphragm valve 125, whereby the first emergency passageway 122 is connected to the second emergency passageway 126 and hence to the brake cylinder pressure line so that the emergency reservoir 124 supplies compressed air to the brake cylinder 160.

Specific details of the alternate pressure control passageway 132 are shown in FIG. 6. Alternate pressure control passageway 132 includes control choke 134 which, preferably, is protected from debris by filter 135. Alternate pressure control passageway 132 establishes the control pressure when emergency electrically activated valve 127 is closed.

Emergency control choke 134 has a much higher resistance to fluid flow than gap 131 in emergency electrically activated valve 127, so when valve 127 is energized to open gap 131, the control pressure is about equal to a pressure in fourth passageway 128, which terminates in exhaust port 130.

Figure 9:
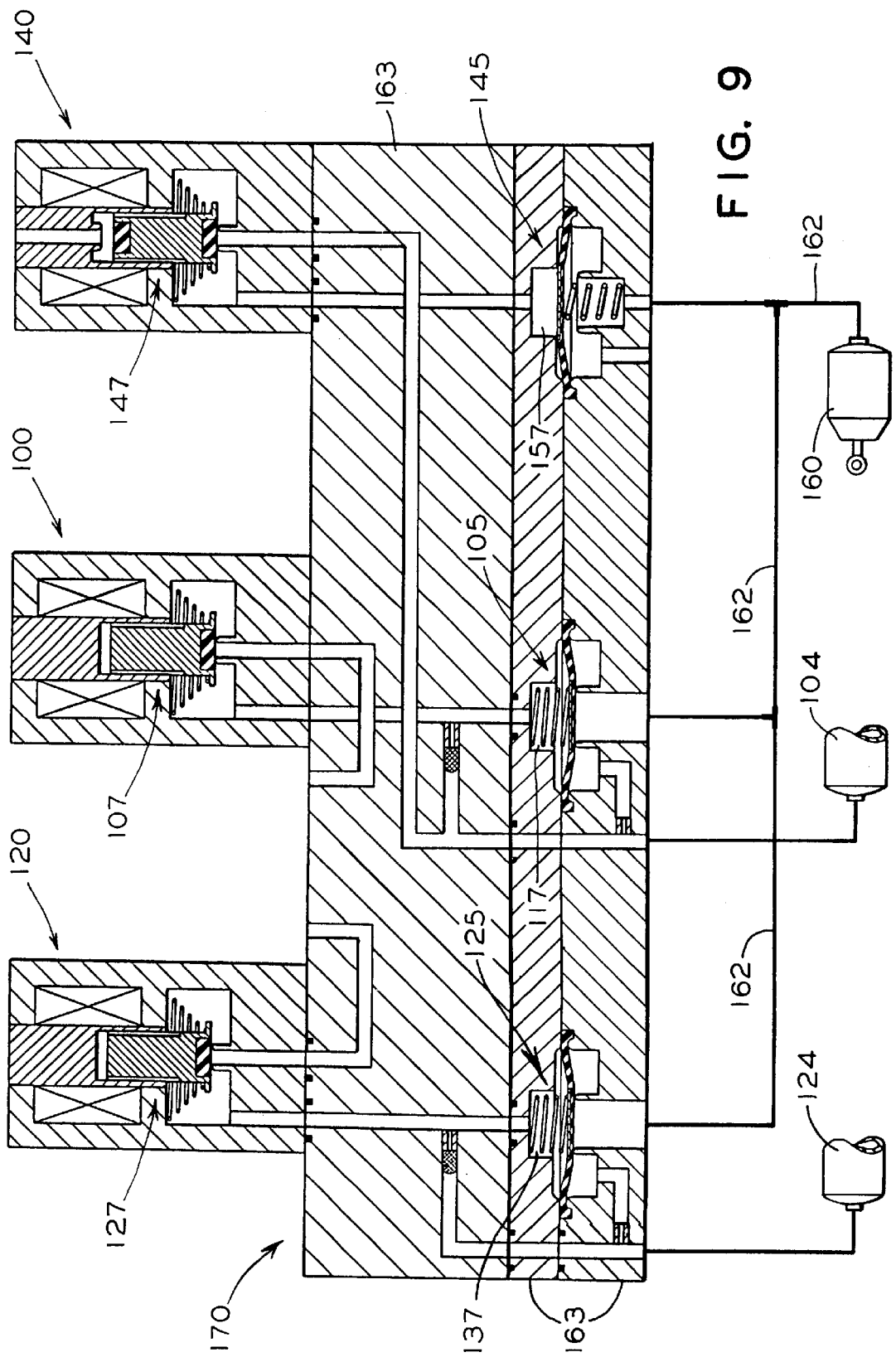
FIG. 9 shows an electro-pneumatic brake valve assembly having an emergency brake valve, a service brake valve and a release valve.

FIG. 7 shows an electrically activated valve assembly 100 connected as a service brake application valve on a railway vehicle. Valve assembly 100 is also shown in FIG. 9. The first service brake passageway 102 is connected to an auxiliary compressed air reservoir 104 of the railway vehicle. The second service brake passageway 106 is connected to brake cylinder pressure line 162 of the railway vehicle. The fourth service brake passageway 108 is connected to an exhaust 110. The alternate pressure control 112 is connected to the fifth service brake passageway 119 which is connected to the auxiliary reservoir 104 of the railway vehicle, so that when the electrically activated valve 107 is deenergized, the control pressure is elevated to about a pressure of the auxiliary reservoir 104 and a net force on the diaphragm 101 closes the diaphragm valve 105, and so that when the electrically activated valve 107 is energized, the control pressure is vented to the fourth passageway 108 and therefore to the exhaust 110 so that a net force on diaphragm 101 unseats diaphragm 101 thereby opening the diaphragm valve 105, whereby the first service brake passageway 102 is connected to the second service brake passageway 106 and hence to the brake cylinder pressure line 162, so that the auxiliary reservoir 104 supplies compressed air to the brake cylinder 160.

FIG. 7 shows details of alternate pressure control passageway 112, which is connected by control choke 114 to an elevated pressure source which is fifth service brake passageway 119 which is connected to auxiliary reservoir 104. Alternate pressure control passageway 112 establishes the control pressure when service electrically activated valve 107 is closed. Service control choke 114 is protected from debris by filter 115 mounted between control choke 114 and fifth service brake passageway 119.

Service control choke 114 has a much higher resistance to fluid flow than gap 111 in service electrically activated valve 107, so when valve 107 is energized to open gap 111, the control pressure is about equal to a pressure in fourth passageway 108, which terminates in exhaust port 110.

FIG. 8 shows electrically activated valve assembly 140 according to the present invention which is connected as a release valve in a railway vehicle airbrake system. Valve assembly 140 is also included in FIG. 9. First release valve passageway 142 is connected to exhaust 144. The second release valve passageway 146 is connected to a brake cylinder pressure line 162 of the railway vehicle. The fourth release valve passageway 148 is connected to an elevated pressure source which is auxiliary reservoir 104. The fifth release valve passageway 150 is connected to an exhaust 151, so that when the electrically activated valve 147 is deenergized, the control pressure is vented to the fifth passageway 150 and therefore to the exhaust 151 so that a net force on the diaphragm 141 unseats the diaphragm, whereby the first release valve passageway 142 is connected to the second release valve passageway 146 so that the brake cylinder exhausts through brake cylinder pressure line 162. When the electrically activated valve 147 is energized, the control pressure is connected to the elevated pressure source 104 through fourth passageway 148 so that a net force on the diaphragm closes diaphragm valve 145 so that the brake cylinder 160 does not exhaust.

FIG. 9 shows electrically activated brake valve assembly 170 for a pneumatic brake system on a railway vehicle. Portions of this assembly are also shown in FIGS. 6, 7, and 8. Assembly 170 has an electrically activated service brake valve assembly 100 having a service electrically activated valve 107 connected so as to control pressure in a service control chamber 117 of a service diaphragm valve 105. The service diaphragm valve 105 has a first service flow passage 102 connected to an auxiliary reservoir 104 of the railway vehicle. Service diaphragm valve 105 also has a second service flow passage 106 connected to a brake cylinder pressure line 162 so that an electrical signal to the service electrically activated valve 107 controls air flow to the brake cylinder pressure line 162 to make a service brake application.

Electrically activated brake valve assembly 170 also has an electro-pneumatic emergency brake valve assembly 120 having an emergency electrically activated valve 127 connected so as to control pressure in an emergency control chamber 137 of an emergency diaphragm valve 125. The emergency diaphragm valve 125 has a first emergency flow passage 122 connected to an emergency reservoir 124 of the railway vehicle and a second emergency flow passage 126 connected to the brake cylinder pressure line 162 so that an electrical signal to the emergency electrically activated valve 127 controls air flow to the brake cylinder pressure line 162 to make an emergency brake application.

Electrically activated brake valve assembly 170 also has an electro-pneumatic release valve assembly 140 having a release electrically activated valve 147 connected to so as to control pressure in a release control chamber 157 of a release diaphragm valve 145. Release diaphragm valve 145 has a first release flow passage 142 connected to exhaust 144 and a second release flow passage 146 connected to the brake cylinder pressure line 162 so that an electrically activated signal to the release electrical valve 147 controls air flow from the brake cylinder pressure line 162 to the exhaust 144. Brake cylinder pressure line 162 is connected to brake cylinder 160.

Figure 10:
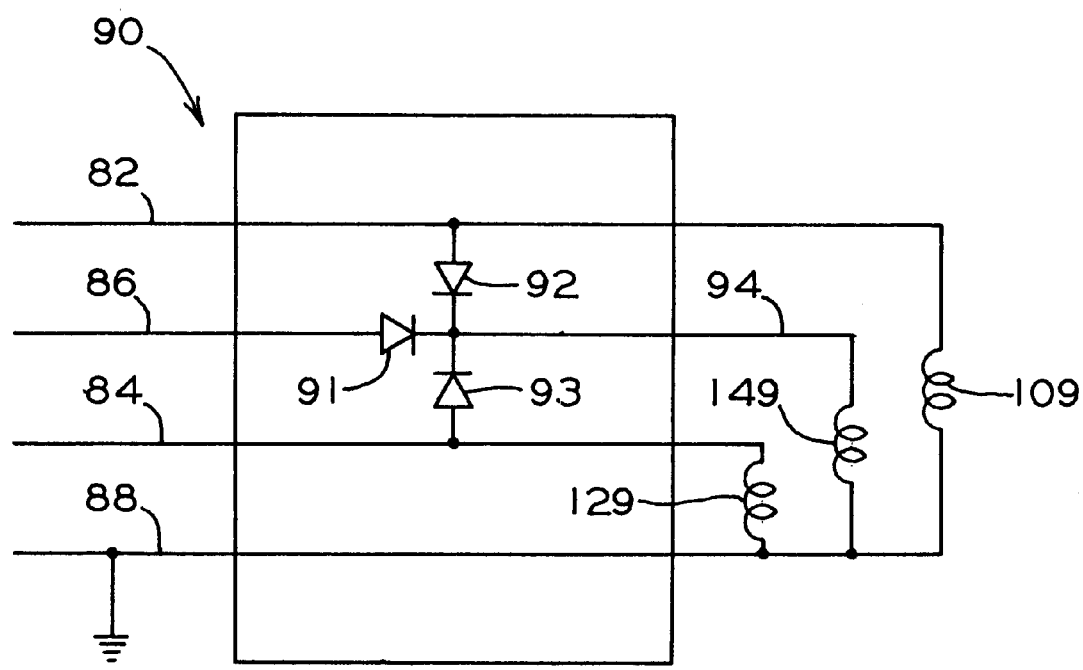
FIG. 10 is a schematic diagram of a presently preferred electrical interlock according to the present invention to prevent simultaneous application and release of a brake system.

FIG. 10 shows an electrical interlock, generally designated 90. It is connected to a service brake application signal line 82, a release signal line 86 and an emergency brake application signal line 84. Additionally, such electrical interlock 90 may be connected to a common line 88. Common line 88 preferably is connected to ground, as shown in FIG. 10.

A rectifying diode 92 applies a voltage to release signal line 86 whenever the service brake application signal line 82 is energized. Rectifying diode 93 applies a voltage to the release signal line 86 whenever the emergency brake application signal line 84 is energized. A rectifying diode 91, preferably, is added to prevent reverse currents from flowing in release incoming signal line 86. Release signal line 94 is normally energized through rectifying diode 91 from release incoming signal line 86. If the system has a positive common and signals with negative voltages on lines 82, 84, and 86, then the directions of diodes 91, 92, and 93 will be reversed. Service brake application signal line 82 is connected to coil 109 in electrically activated valve 107. Emergency brake application signal line 84 is connected to coil 129 in electrical valve 127. Release signal line 94 is connected to coil 149 in electrically activated valve 147.

It should be noted that in the electrically activated brake valve assembly 170 described above, a service brake application may be made using either fluid from the auxiliary reservoir 104 or the emergency reservoir 124. If the emergency reservoir 124 is used for a auxiliary brake application, the service reservoir 104 may be reserved for an emergency brake application.

The presently most preferred embodiment of the invention is the electrically activated brake valve assembly 170 described above, which combines service, emergency and release valve functions in a single housing 163. Housing 163 is preferably formed as a flowblock.

While a presently preferred and various additional alternative embodiments of the instant invention have been described in detail above, in accordance the patent statutes, it should be recognized that various other modifications and adaptations of the invention may be made by those persons who are skilled in the relevant art without departing from either the spirit of the invention or the scope of the appended claims.

I claim:

1. An electrically activated valve assembly for control of a fluid under pressure, said electrically activated valve assembly comprising:
   (a) a fluid containment structure;
   (b) a diaphragm valve disposed within said fluid containment structure, said diaphragm valve including;
      (i) a control chamber,
      (ii) a diaphragm disposed adjacent said control chamber, said control chamber being on a first side of said diaphragm, said diaphragm having a diaphragm sealing surface on a second side thereof,
      (iii) a flow barrier on said second side of said diaphragm, said flow barrier having a sealing surface for cooperating with said sealing surface of said diaphragm,
      (iv) a first passageway having at least a portion thereof disposed on said second side of said diaphragm on a first side of said flow barrier,
      (v) a second passageway having at least a portion thereof disposed on said second side of said diaphragm on a second side of said flow barrier, said diaphragm having at least a first position wherein a first gap exists between said sealing surface of said diaphragm and said sealing surface of said flow barrier so that fluid communication is provided between said first passageway and said second passageway, said diaphragm also having a second position wherein said sealing surface of said diaphragm seats against said sealing surface of said flow barrier thereby preventing fluid communication between said first passageway and said second passageway, and
      (vi) said first and second positions of said diaphragm being determined by a control pressure in said control chamber in relation to a combination of a first pressure in said first passageway and a second pressure in said second passageway;
   (c) a third passageway having a third pressure, said third passageway connected to said control chamber of said diaphragm valve so that said control pressure is approximately equal to said third pressure in said third passageway;
   (d) an electrically activated valve disposed within said fluid containment structure, said electrically activated valve responsive to an electrical signal to control fluid communication between said third passageway and a fourth passageway having a fourth pressure so that when said electrically activated valve is energized, said control pressure generally equals said fourth pressure of said fourth passageway;
   (e) an alternate pressure control path connected to said third passageway and to a fifth passageway having a fifth pressure so that when said electrically activated valve is deenergized, said third pressure and said control pressure generally equalize with said fifth pressure; and
   (f) whereby said electrically activated valve controls said control pressure and therefore controls said fluid communication between said first passageway and said second passageway.

2. An electrically activated valve assembly, according to claim 1, wherein said valve assembly further includes a choke disposed in said first passageway to control a rate of fluid communication through said diaphragm valve.

3. An electrically activated valve assembly, according to claim 1, wherein said diaphragm has a diaphragm stiffening member affixed to said first side of said diaphragm.

4. An electrically activated valve assembly, according to claim 1, wherein said sealing surface of said flow barrier is formed as a unitary structure, at least a portion of said sealing surface of said flow barrier for enclosing at least a portion of said second passageway and said portion of said first passageway.

5. An electrically activated valve assembly, according to claim 4, wherein said sealing surface of said flow barrier is formed as a circular annulus.

6. An electrically activated valve assembly, according to claim 1, wherein said diaphragm valve further includes a spring pressing against said diaphragm to bias it toward said sealing surface of said flow barrier and into a closed position in which it does not permit flow between said first passageway and said second passageway.

7. An electrically activated valve assembly, according to claim 6, wherein said spring is disposed within said control chamber.

8. An electrically activated valve assembly, according to claim 1, wherein said diaphragm valve further includes a spring pressing against said diaphragm to bias it away from said sealing surface of said flow barrier and into an open position in which it permits flow between said first passageway and said second passageway.

9. An electrically activated valve assembly, according to claim 8, wherein said spring is disposed within said second passageway.

10. An electrically activated valve assembly, according to claim 9, further having an inside shoulder in said second passageway to provide a seat for said spring.

11. An electrically activated valve assembly, according to claim 1, wherein said electrically activated valve when it is energized has a second gap connecting said third passageway to said fourth passageway and when it is deenergized has a third gap disposed in said alternate pressure control path to provide fluid communication between said third passageway and said fifth passageway, said third gap being closed when said electrically activated valve is energized and said second gap being closed when said electrically activated valve is deenergized, so that when said electrically activated valve is deenergized, said third pressure and said control pressure are about equal to said fifth pressure of said fifth passageway, and so that when said electrically activated valve is energized, said third pressure and said control pressure are about equal to said fourth pressure of said fourth passageway.

12. An electrically activated valve assembly, according to claim 1, wherein said electromagnetic valve when it is energized has a second gap connecting said third passageway to said fourth passageway and said alternate pressure control path includes a control choke connected to said fifth passageway, so that when said electromagnetic valve is deenergized said second gap is closed, said control pressure in said control space is about equal to said fifth pressure due to flow through said control choke, said control choke having a much higher resistance to flow of said fluid than said second gap so that when said electromagnetic valve is energized to open said second gap, said pressure in said control space is approximately equal to said fourth pressure in said fourth passageway due to flow through said second gap.

13. An electrically activated valve assembly, according to claim 12, wherein said alternate pressure control path has a filter to prevent foreign material from occluding said control choke.

14. An electrically activated valve assembly, according to claim 13, wherein said filter is disposed between said control choke and said fifth passageway.

15. An electrically activated valve assembly, according to claim 1, connected as a service brake application valve on a railway vehicle, said first passageway being connected to an auxiliary compressed air reservoir of such railway vehicle, said second passageway being connected to a brake cylinder of such railway vehicle, said fourth passageway being connected to an exhaust, said fifth passageway being connected to such auxiliary reservoir of such vehicle, so that when said electrically activated valve is deenergized, said control pressure is elevated to about a pressure of such auxiliary reservoir and a net force on said diaphragm closes said diaphragm valve, and so that when said electrically activated valve is energized, said control pressure is vented to said fourth passageway and therefore to said exhaust so that a net force on said diaphragm unseats said diaphragm thereby opening said diaphragm valve, whereby said first passageway is connected to said second passageway and hence to such brake cylinder, so that such auxiliary reservoir supplies compressed air to such brake cylinder.

16. An electrically activated valve assembly, according to claim 1, connected as a emergency brake application valve on a railway vehicle, said first passageway being connected to an emergency compressed air reservoir of such railway vehicle, said second passageway being connected to a brake cylinder of such railway vehicle, said fourth passageway being connected to an exhaust, said fifth passageway being connected to such emergency reservoir of such vehicle, so that when said electrically activated valve is deenergized, said control pressure is elevated to about a pressure of such emergency reservoir and a net force on said diaphragm closes said diaphragm valve, and so that when said electrically activated valve is energized, said control pressure is vented to said fourth passageway and therefore to said exhaust so that a net force on said diaphragm unseats said diaphragm thereby opening said diaphragm valve, whereby said first passageway is connected to said second passageway and hence to such brake cylinder, so that such emergency reservoir supplies compressed air to such brake cylinder.

17. An electrically activated valve assembly, according to claim 11, connected as a release valve in a railway vehicle airbrake system, said first passageway being connected to an exhaust, said second passageway being connected to a brake cylinder of such railway vehicle, said fourth passageway being connected to an elevated pressure source of such airbrake system, said fifth passageway being connected to an exhaust, so that when said electrically activated valve is deenergized, said control pressure is vented to said fifth passageway and therefore to said exhaust so that a net force on said diaphragm unseats said diaphragm, whereby said first passageway is connected to said second passageway so that said brake cylinder exhausts, and so that when said electrically activated valve is energized, said control pressure is connected through said second gap to said elevated pressure source so that a net force on said diaphragm presses said diaphragm against said valve seat and said valve is closed and said brake cylinder does not exhaust.

18. An electrically activated brake valve assembly for a pneumatic brake system on a railway vehicle comprising:

(a) an electro-pneumatic service brake valve having a service electrical valve connected so as to control pressure in a service control chamber of a service diaphragm valve, said service diaphragm valve having a first service flow passage connected to an auxiliary reservoir of such railway vehicle and a second service flow passage connected to a brake cylinder pressure line so that an electrical signal to said service electrical valve controls air flow to said brake cylinder pressure line to make a service brake application;

(b) an electro-pneumatic emergency brake valve having an emergency electrical valve connected so as to control pressure in an emergency control chamber of an emergency diaphragm valve, said emergency diaphragm valve having a first emergency flow passage connected to an emergency reservoir of such railway vehicle and a second emergency flow passage connected to such brake cylinder pressure line so that an electrical signal to said emergency electrical valve controls air flow to said brake cylinder pressure line to make an emergency brake application; and (c) an electro-pneumatic release valve having a release electrical valve connected to so as to control pressure in a release control chamber of a release diaphragm valve, said release diaphragm valve having a first release flow passage connected to an exhaust and a second release flow passage connected to such brake cylinder pressure line so that an electrical signal to said release electrical valve controls air flow from said brake cylinder pressure line to said exhaust.

19. An electrically activated brake valve assembly, according to claim 18, further having an electrical interlock so that when said service electrical valve is energized, or said emergency electrical valve is energized, said release electrical valve is energized.

\* \* \* \* \*